US012798718B2

(12) United States Patent
Badaracco

(10) Patent No.: US 12,798,718 B2
(45) Date of Patent: Nov. 17, 2026

(54) SINGLE-TRACK VEHICLE FRAME HAVING RESILIENT HINGE

(71) Applicant: Erin Badaracco, Tualatin, OR (US)

(72) Inventor: Erin Badaracco, Tualatin, OR (US)

(*) Notice: Subject to any disclaimer, the term of this patent is extended or adjusted under 35 U.S.C. 154(b) by 0 days.

(21) Appl. No.: 18/427,198

(22) Filed: Jan. 30, 2024

(65) Prior Publication Data

US 2025/0242883 A1 Jul. 31, 2025

(51) Int. Cl.
*B62K 25/30* (2006.01)
*B62K 19/18* (2006.01)

(52) U.S. Cl.
CPC .............. *B62K 25/30* (2013.01); *B62K 19/18* (2013.01)

(58) Field of Classification Search
CPC .............................. B62K 25/286; B62K 25/30
See application file for complete search history.

(56) References Cited

U.S. PATENT DOCUMENTS 5,797,613 A * 8/1998 Busby .................... B62K 25/28 403/291
6,036,213 A * 3/2000 Busby .................. B62K 25/286 280/284
6,092,823 A * 7/2000 Busby .................... B62K 19/18 267/269
6,450,520 B1 * 9/2002 Girard .................. B62K 25/286 280/275
6,783,142 B1 * 8/2004 Schober ................. B62K 25/28 280/283
2014/0225347 A1 * 8/2014 Skulason ............... B60G 3/185 280/275
2022/0177071 A1 * 6/2022 Voss ....................... B62K 25/28

* cited by examiner

*Primary Examiner* — Minnah L Seoh
*Assistant Examiner* — Hosam Shabara

(57) ABSTRACT

A single-track vehicle frame is disclosed. The single-track vehicle frame includes a front subframe to support a seat. The single-track vehicle frame includes a rear subframe having a swingarm. A resilient hinge interconnects the front subframe and the rear subframe. Other embodiments are also described and claimed.

14 Claims, 5 Drawing Sheets

SINGLE-TRACK VEHICLE FRAME HAVING RESILIENT HINGE

FIELD

The present disclosure relates to single-track vehicle frames. More particularly, the present disclosure relates to single-track vehicle frames having rear suspensions.

BACKGROUND INFORMATION

Rear suspensions are used on single-track vehicles, such as bicycles or motorcycles, to absorb shocks from the ground. Such rear suspensions include single pivot, linkage-driven single pivot, Horst-link, and twin-link suspensions, each of which incorporate a shock (air or coil) to absorb impacts. The shock absorption provided by rear suspensions maintain vehicle contact with the ground and contribute to rider control and comfort.

SUMMARY

Existing rear suspensions, such as those listed above, are complex and expensive. Shocks and linkages must be precisely designed and tuned to achieve a comfortable riding experience. The shocks incorporate several moving parts that are susceptible to wear, stiction, and failure. Furthermore, when the shocks do fail, the parts can be costly to replace or repair. Accordingly, there is a need for a single-track vehicle frame having a rear suspension that has no moving parts, is inexpensive to manufacture or replace, and provides an enjoyable riding experience by reliably absorbing bumps and flattening a trail.

The present invention provides a single-track vehicle frame incorporating a rear suspension that includes a resilient hinge. In an embodiment, the single-track vehicle frame includes a front subframe to support a seat. The single-track vehicle frame includes a rear subframe having a swingarm. The single-track vehicle frame includes a resilient hinge interconnecting the front subframe and the rear subframe. Accordingly, the resilient hinge can interconnect the front subframe, which supports the seat, to the rear subframe having the swingarm, providing relative movement between the subframes when loaded by an impact.

In an embodiment, the single-track vehicle frame may be a bicycle frame. For example, the bicycle frame can include the front subframe having a seat tube, and the rear subframe having a pair of chainstays. The resilient hinge can interconnect the front subframe and the rear subframe. Accordingly, the resilient hinge can interconnect the front subframe having the seat tube to the rear subframe having the pair of chainstays, providing relative movement between the subframes.

In an embodiment, a single-track vehicle that having the single-track vehicle frame can be a bicycle. For example, the bicycle can have a fork coupled to a front wheel. The fork can be mounted on a head tube of the front subframe. Furthermore, the rear subframe can have the pair of chainstays which are connected to a rear wheel. Accordingly, the resilient hinge can interconnect the front subframe coupled to the front wheel with the rear subframe coupled to the rear wheel, providing relative movement between the subframes when the bicycle encounters a bump in a trail.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
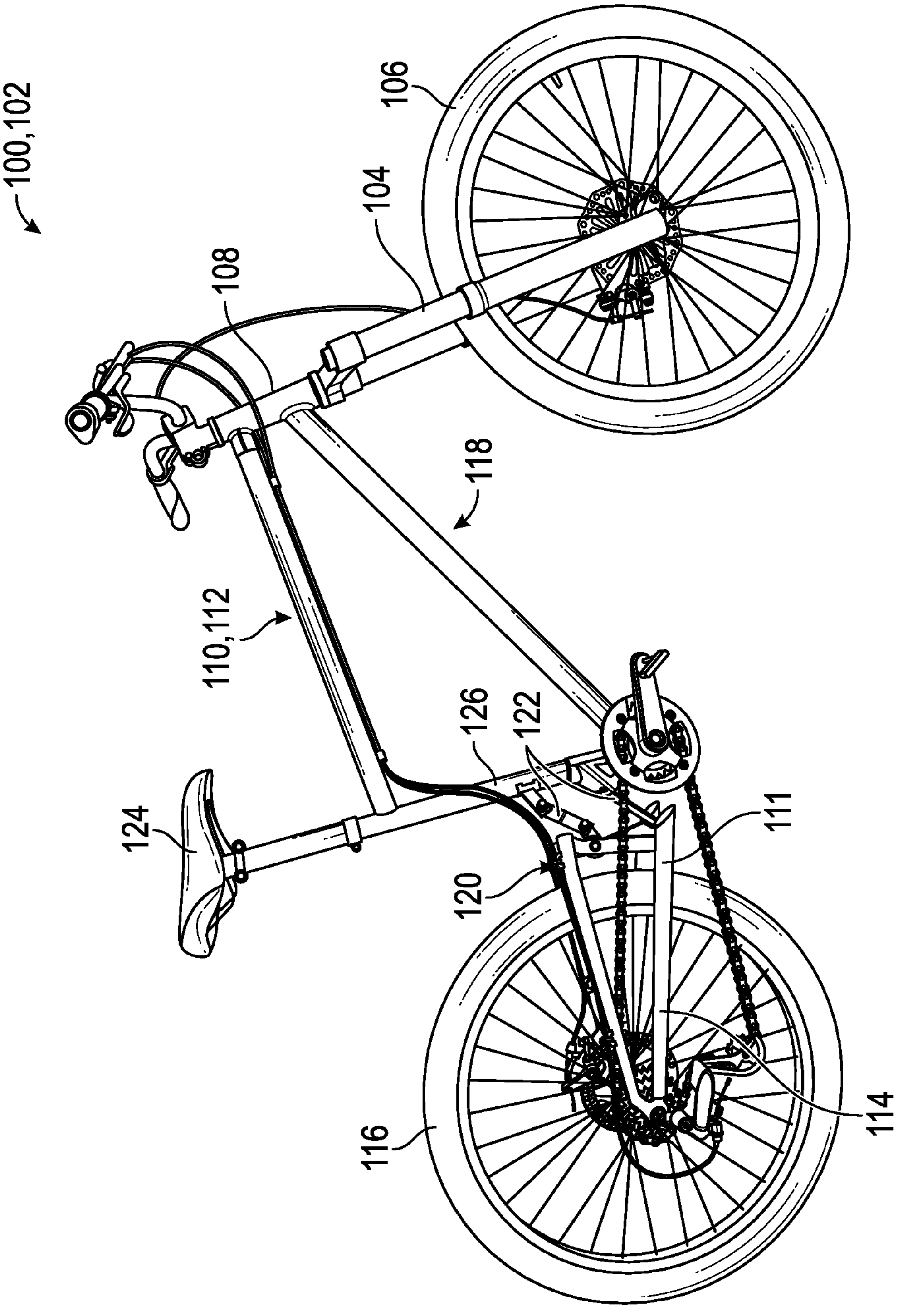
FIG. 1 is a side view of a single-track vehicle, in accordance with an embodiment.

Embodiments describe a single-track vehicle frame having a resilient hinge. The resilient hinge can be integral to a rear suspension of the single-track vehicle, such as a rear suspension of a bicycle, e.g., a mountain bike. The single-track vehicle may be other vehicles, however, such as a motorcycle, and reference to the single-track vehicle being a bicycle is made by way of example and not limitation.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "front" may indicate a first direction relative to a reference point. Similarly, "rear" may indicate a second direction opposite to the first direction. Such terms are provided to establish relative frames of reference, however, and are not intended to limit the use or orientation of a single-track vehicle frame to a specific configuration described in the various embodiments below.

In an aspect, a frame of a single-track vehicle has an integral rear suspension that includes a resilient hinge interconnecting a front subframe and a rear subframe of the frame. The resilient hinge can, for example, include a fixed beam having a front beam end fixed to the front subframe and a rear beam end fixed to the rear subframe. When the frame is mounted on wheels, as in a bicycle, and the single-track vehicle is ridden over bumps, the loading applied to the subframes can cause the fixed beam to bend. The bending beam provides a flexible joint between the subframes, allowing the subframes to pivot relative to each other from an initial state to a deflected state. More particularly, the impact is absorbed through spring deformation of the fixed beam. When the resilient hinge unloads and elastically unbends, the subframes return to the initial state, dissipating absorbed energy. The fixed beam, which may be an inexpensive plate having no moving parts or stiction, can accordingly provide a rear suspension that is simple, reliable, and effective.

Referring to FIG. 1, a side view of a single-track vehicle is shown in accordance with an embodiment. A single-track vehicle 100 may be any vehicle that produces a single track on the ground. For example, the single-track vehicle 100 can be a scooter or a motorcycle. In an embodiment, the single-track vehicle 100 is a bicycle 102. The bicycle 102 can have a fork 104 connected to, e.g., a mounted on, a front wheel 106, which can be steered using handlebars. More particularly, the fork 104 can be mounted on a head tube 108 of a single-track vehicle frame 110, e.g., a bicycle frame 112, and the handlebars can be manipulated to rotate the fork 104 and steer the front wheel 106. The bicycle frame 112 of the bicycle 102 can also include a pair of chainstays 114. The chainstays 114 can be connected to, e.g., mounted on a rear wheel 116.

In an embodiment, the single-track vehicle frame 110 is segmented. More particularly, the single-track vehicle frame 110 can include a front subframe 118 and a rear subframe 120. The subframes can be independent from each other. The subframes may, however, be constrained relative to each other. For example, as described below, a rear suspension 122 can interconnect the subframes. The rear suspension 122 can allow limited movement of the front subframe 118 relative to the rear subframe 120 within a predetermined range of motion. The subframes can move relative to each other within the range of motion, however, the subframes are physically connected to each other and constrained by the integral rear suspension 122 such that the single-track vehicle frame 110 operates as a system.

The subframes 118, 120 can be rigid. More particularly, the subframes may be formed from various structural components, such as tubes, which are rigidly connected. For example, the front subframe 118 can be a front triangle of the bicycle frame 112, and the rear subframe 120 can be a rear triangle of the bicycle frame 112. Each subframe can be designed to support the loading applied during riding without deforming beyond a yield stress, e.g., less than 0.2% strain. Accordingly, while the subframes will inherently absorb some shock and vibration, the subframes experience minimal deformation and are considered rigid bodies.

It will be appreciated that the subframes 118, 120 may be further segmented into components that perform a predetermined function. For example, the front subframe 118 of the single-track vehicle frame 110 may be configured to support a seat 124. Accordingly, in the case of the bicycle 102, the front subframe 118 can have a seat tube 126 to receive and hold the seat 124. Similarly, as described above, the front subframe 118 can have the head tube 108, to receive and hold the fork 104. The rear subframe 120 can also have subcomponents suited to their purpose. For example, the rear subframe 120 of the single-track vehicle frame 110 can have a swingarm 111 to support on the rear wheel 116. In the case of the bicycle frame 112, the swingarm 111 can include a pair of chainstays 114 that extend in a generally horizontal direction, e.g., substantially parallel to the ground, and extend forward from a hub of the rear wheel 116 toward a bottom bracket of the bicycle 102. Other components of the bicycle frame 112, such as a steerer tube that inserts into the head tube 108, a top tube, a down tube, a brake bridge, etc., will be understood and are not described further for the purpose of brevity.

Figure 2:
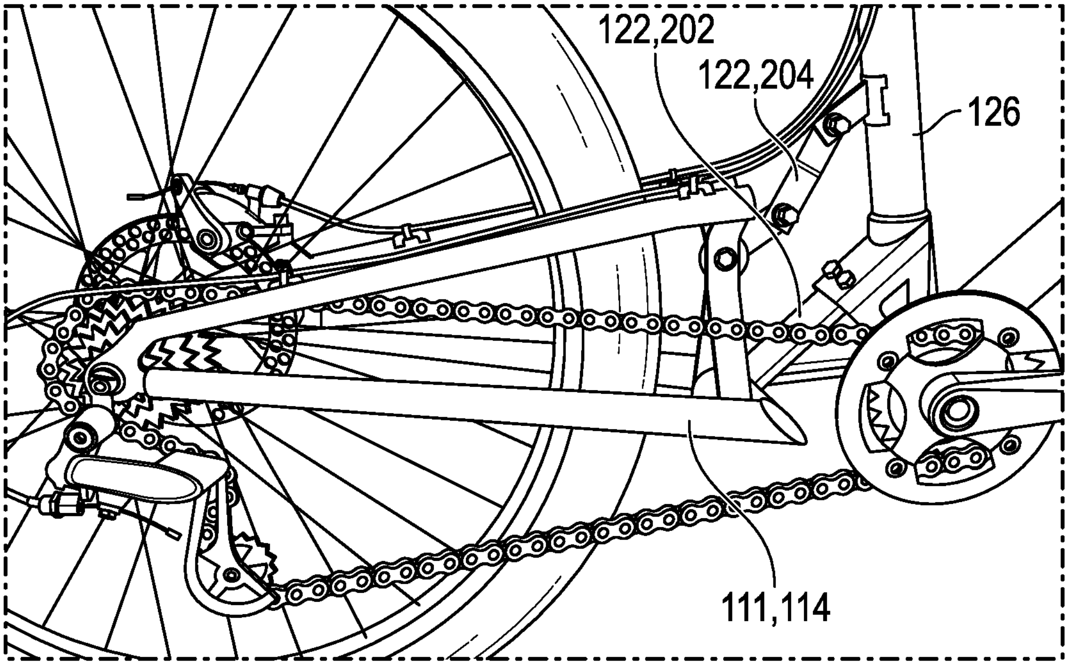
FIG. 2 is a right-side perspective view of a rear suspension, in accordance with an embodiment.

Referring to FIG. 2, a right-side perspective view of a rear suspension is shown in accordance with an embodiment. The rear suspension 122 of the single-track vehicle frame 110 can include a resilient hinge 202. The resilient hinge 202 can be a component that acts as a flexible and resilient joint interconnecting the front subframe 118 and the rear subframe 120. Accordingly, the resilient hinge 202 can extend from the front subframe 118 to the rear subframe 120 to connect the front subframe 118 to the rear subframe 120.

The resilient hinge 202 can be an integral hinge that is joined or fixed to the adjacent subframes. For example, as described below, a first end of the resilient hinge 202 can connect to the seat tube 126 above the bottom bracket that holds pedals, and a second end of the resilient hinge 202 can connect to the swingarm 111, e.g., adjacent to the chainstays 114. During riding, the resilient hinge 202 can experience material deformation that exceeds the deformation experienced by other frame components. The material of the resilient hinge 202 may accordingly have a yield strength that is higher than the yield strength of the material used to form the other frame components. For example, the rigid frame segments (the front subframe 118 and the rear subframe 120) may be formed from an aluminum alloy having a yield strength of 400 MPa and the resilient hinge 202 may be formed from a spring steel, such as tempered 5160 carbon steel, having a yield strength of 670 MPa. The resilient hinge 202 can, when stressed and deformed below its comparatively higher yield strength, return to its original shape. The resilient hinge 202 can therefore deflect from the original shape to absorb shock and then recover from the deflection to the original shape. Spring steel is provided as an example, however, other materials having high yield strength and resilience may be used, including polymers, fiber-reinforced polymers, titanium alloy, etc.

Figure 4:
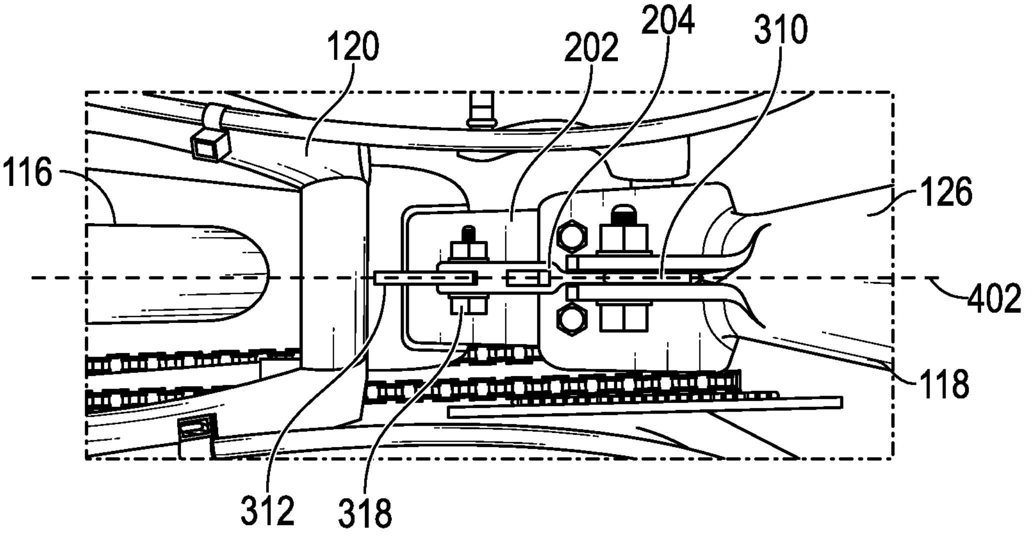
FIG. 4 is a top perspective view of a rear suspension, in accordance with an embodiment.

The resilient hinge 202 can flex to allow the front subframe 118 to move relative to the rear subframe 120. Stresses applied to the single-track vehicle frame 110 can induce twisting of the resilient hinge 202. Such twisting may be undesirable. More particularly, the riding experience may benefit from constraining relative movement of the subframes to occur within a vertical plane (FIG. 4). The vertical plane can be defined by the front wheel 106 and the rear wheel 116. More particularly, the rims of the front wheel 106 and the rear wheel 116 can be aligned with and contained in the vertical plane. When the bicycle 102 is upright 316 and ridden along the ground, the vertical plane can be perpendicular to the ground. Excessive twisting of the resilient hinge 202 could allow the wheels to tilt outside of the vertical plane, which may compromise riding control.

In an embodiment, the rear suspension 122 includes a support linkage 204 to provide lateral support and resist twisting of the resilient hinge 202. The support linkage 204 can interconnect the front subframe 118 and the rear subframe 120. More particularly, a first end of the support linkage 204 can connect to the front subframe 118, e.g., at a revolute joint, e.g., a pin or bolt, and a second end of the support linkage 204 can connect to the rear subframe 120, e.g., at another revolute joint. The support linkage 204 can allow the revolute joints to move relative to each other within the vertical plane. The support linkage 204 can have lateral stiffness, however, and can resist movement of the revolution joints relative to each other in a lateral direction, e.g., lateral to the vertical plane. Accordingly, the support linkage 204 can constrain the single-track vehicle frame 110 to remain within the vertical plane such that the front wheel 106 and the rear wheel 116 are aligned during riding.

Figure 3:
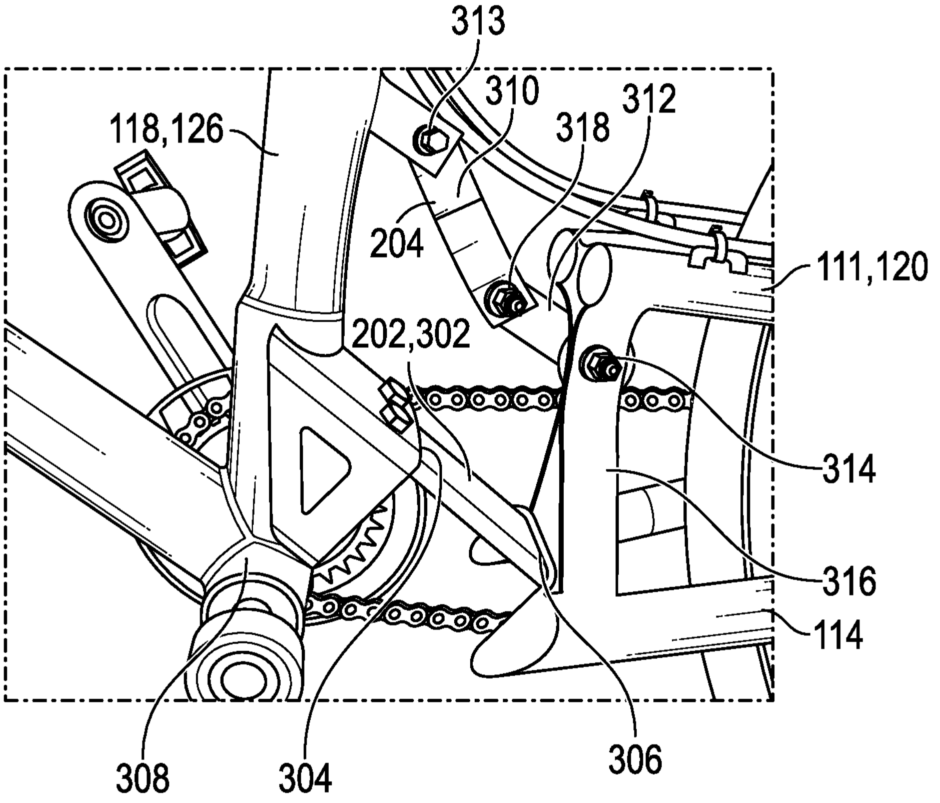
FIG. 3 is a left-side perspective view of a rear suspension, in accordance with an embodiment.

Referring to FIG. 3, a left-side perspective view of a rear suspension is shown in accordance with an embodiment. The resilient hinge 202, which can be any mechanical element that provides localized, resilient flexure at a location between the front subframe 118 in the rear subframe 120, may include a fixed beam 302. The fixed beam 302 can be between the front subframe 118 and the rear subframe 120. More particularly, the fixed beam 302 can have a front beam end 304 at a forward location behind the front subframe 118, and a rear beam end 306 at rearward location in front of the rear subframe 120. The front beam end 304 may be coupled to the front subframe 118 and the rear beam end 306 can be coupled to the rear subframe 120. The seat tube 126 can extend upward from a bottom bracket shell 308. In an embodiment, the front beam end 304 connects to the seat tube 126, or a bracket attached to the seat tube 126, above the bottom bracket shell 308. For example, the front beam end 304 can attach to the seat tube 126 or bracket at a location that is 1 to 6 inches above the bottom bracket shell 308. The fixed beam 302 can therefore extend from the seat tube 126 toward the rear subframe 120. More particularly, the fixed beam 302 can extend to the rear beam end 306 at the swingarm 111, e.g., at the chainstays 114. The rear beam end 306 can attach to the swingarm 111 at a bracket, crossbar, etc. laterally between the chainstays 114. The fixed beam 302 can extend rearward and downward from the forward bracket, and can connect to the rear bracket at the swingarm 111 below the front beam end 304. In an embodiment, the rear beam end 306 attaches to the bracket at a location vertically lower than, or vertically aligned with, the bottom bracket shell 308. The fixed beam 302 may therefore, as described below, have a slant such that the front beam end 304 is vertically higher than the rear beam end 306 (the fixed beam 302 is not horizontal or parallel to the ground).

The support linkage 204 of the single-track vehicle frame 110 can, like the resilient hinge 202, interconnect the front subframe 118 in the rear subframe 120. The interconnection may, however, be a passive interconnection. More particularly, unlike the resilient hinge 202 that applies an active bias toward the initial state of the frame, the support linkage 204 may allow the subframes to move relative to each other within the vertical plane. Nonetheless, the support linkage 204 can resist relative movement between the subframes in a lateral direction, transverse to the vertical plane. The motion constraints provided by the support linkage 204 derive from the structure described below.

In an embodiment, the support linkage 204 includes a front link 310 and a rear link 312. The front link 310 can be connected to the front subframe 118. For example, the front link 310 can include a bar, plate, or other rigid member having a front link end 313 connected to the seat tube 126 (or a bracket mounted on the seat tube 126). Similarly, the rear link 312 can be connected to the rear subframe 120. For example, the rear link 312 can include a bar, plate, or other rigid member having a rear link end 314 connected to the swingarm 111. The swingarm 111 can be a rigid framework including the chainstays 114 and an upright 316 extending upward from the chainstays. In an embodiment, the rear link 312 connects to the upright 316. The front link 310 and the rear link 312 can connect to respective subframe members at respective joints. For example, the front link end 313 can be attached to the front subframe 118 at a revolute joint that allows the front link 310 to swing relative to the seat tube 126. Similarly, the rear link end 314 can be attached to the rear subframe 120 at a joint, e.g., a revolute joint, which allows the rear link 312 to swing relative to the upright 316. The links may therefore, when not connected to each other, provide rigid members that swing relative to their respective subframes.

In an embodiment, the front link 310 is connected to the rear link 312 at an intermediate joint 318. More particularly, the support linkage 204 can include the intermediate joint 318 interconnecting the front link 310 and the rear link 312. The intermediate joint 318 can be a revolute joint. More particularly, the front link 310 and the rear link 312 can swing relative to each other about the intermediate joint 318. The support linkage 204 may therefore include a two-arm linkage in which the arms are rigid and swing to allow the subframes to move relative to each other within the vertical plane, however, the rigid arms resist lateral movement of the subframes relative to each other transverse to the vertical plane.

Referring to FIG. 4, a top perspective view of a rear suspension is shown in accordance with an embodiment. In the top view, a vertical plane 402 is shown extending downward into the page. The vertical plane 402, as described above, can intersect the rims of the front wheel 106 and the rear wheel 116. Similarly, the vertical plane 402 can extend downward through the resilient hinge 202 and the support linkage 204. Accordingly, the resilient hinge 202 may be laterally aligned with the support linkage 204.

In the top view, it is evident that the resilient hinge 202 can be aligned with and in between the rear subframe 120 and the front subframe 118. More particularly, the resilient hinge 202 can be longitudinally between the front wheel 106 and the rear wheel 116. The resilient hinge 202 can be within the vertical plane 402 between the seat tube 126 and the rear wheel 116.

The resilient hinge 202 can allow relative movement between the front subframe 118 and the rear subframe 120 in an upward and downward direction (into and out of the page). As described above, the support linkage 204 can resist twisting of the resilient hinge 202, and resist lateral movement (up and down along the face of the page) between the seat tube 126 and the swingarm 111. More particularly, the support linkage 204 can act as a link to connect the front subframe 118 to the rear subframe 120, and to provide lateral stiffness to the system without resisting vertical movement of the swingarm 111 relative to the front subframe 118. The rear suspension 122 therefore stabilizes the front subframe 118 relative to the rear subframe 120 while allowing constrained motion between the subframes to absorb impacts applied to the frame through the wheels.

Figure 5:
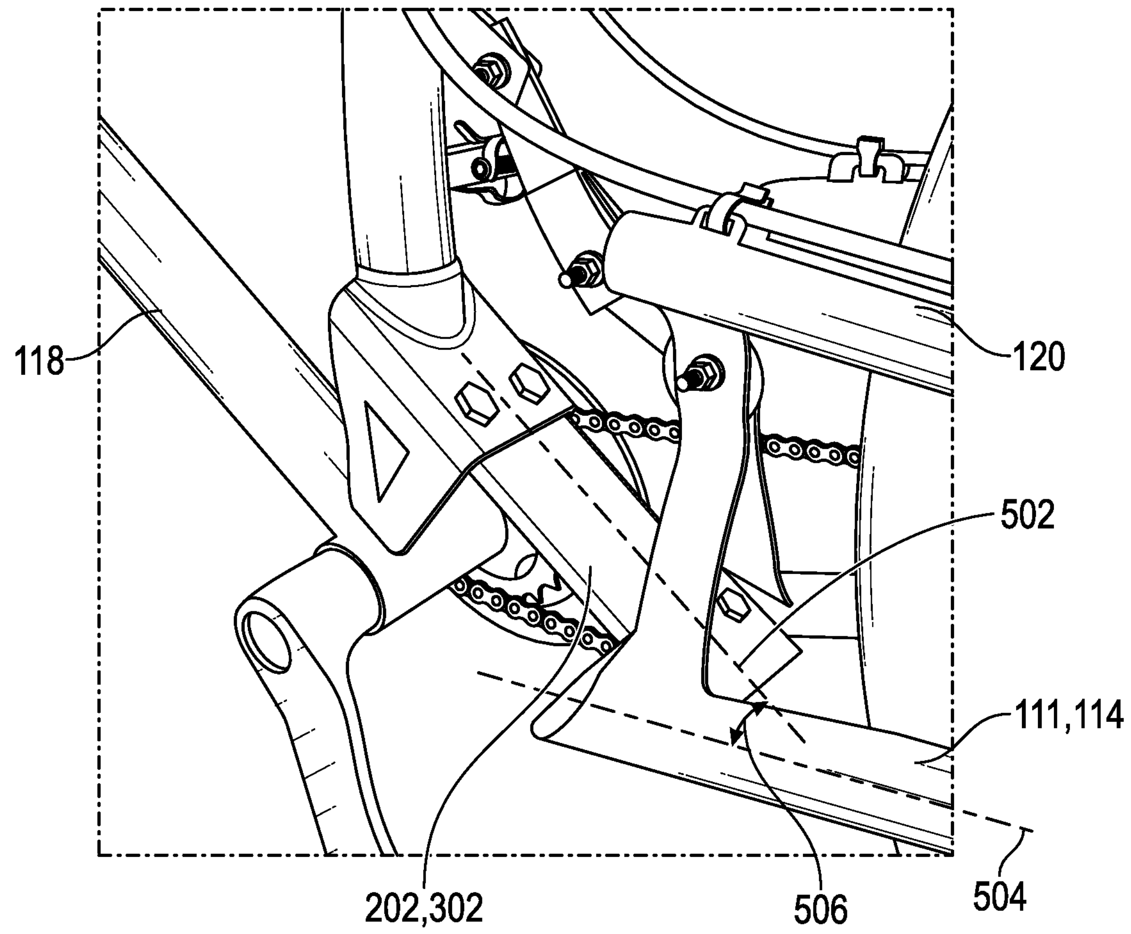
FIG. 5 is a left-side perspective view of a rear suspension, in accordance with an embodiment.

Referring to FIG. 5, a left-side perspective view of a rear suspension is shown in accordance with an embodiment. As described above, the subframes of the single-track vehicle 100 are rigid bodies. By contrast, the resilient hinge 202 experiences substantial deformation, e.g., in bending, during operation. In the case of the fixed beam 302, the beam ends can be attached, by welds or fasteners, to the subframes, and the beam can bend along a neutral axis 502 when moments are applied to the beam ends. Such moments can result from the weight of the rider pressing downward on the frame while the ground, and more particularly bumps, pushes upward on the wheels. The net effect of the loading, e.g., beam loading, can produce deformation of the resilient hinge 202, causing the neutral axis 502 of the fixed beam 302 to curve, e.g., about a transverse axis extending orthogonal to the vertical plane 402.

In an unloaded state, such as when the single-track vehicle 100 is not being ridden, the neutral axis 502 can extend at an angle 506 to a horizontal plane 504. The horizontal plane 504 may be defined as described further below with respect to FIG. 6.

Figure 6:
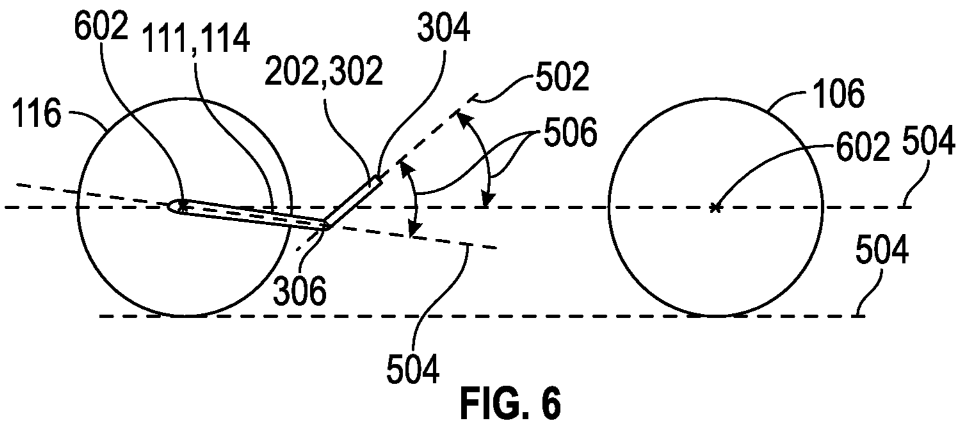
FIG. 6 is a schematic view of a single-track vehicle having a resilient hinge, in accordance with an embodiment.

Referring to FIG. 6, a schematic view of a single-track vehicle having a resilient hinge is shown in accordance with an embodiment. The horizontal plane 504 may extend transverse and, optionally, perpendicular to the vertical plane 402. The horizontal plane 504 may alternatively or additionally be defined relative to the swingarm 111. More particularly, the swingarm 111 can define the horizontal plane 504 and, in the case of the bicycle 102, the pair of chainstays 114 can define the plane. The chainstays 114 extend along respective chainstay axes, central to the chainstay 114 tubes, which are substantially parallel to the ground. In an embodiment, the chainstay axes can define the horizontal plane 504 in that the horizontal plane contains the central axes. It will be appreciated, that the horizontal plane 504 may be defined by other components of the single-track vehicle 100. For example, the horizontal plane 504 may be a plane containing the lateral axes 602 of the wheel hubs. Alternatively, the horizontal plane 504 may be defined by an external feature that serves as a datum relative to the single-track vehicle 100. For example, the horizontal plane 504 can be the ground on which the wheels of the single-track vehicle 100 are in contact. In any case, the neutral axis 502 can extend at an oblique angle 506 relative to the horizontal plane 504. More particularly, the angle 506 may be defined between the neutral axis 502, which extends centrally through the fixed beam 302 of the resilient hinge 202, and the horizontal plane 504, and the angle 506 may be neither perpendicular (90 degrees) nor parallel (0 degrees).

In an embodiment, the angle 506 between the neutral axis 502 and the horizontal plane 504 has a substantial vertical and horizontal component. More particularly, the angle 506 may be in a range of 25 to 65 degrees, relative to the horizontal plane 504. For example, the angle 506 may be in a range of 40 to 50 degrees, e.g., 45 degrees. Accordingly, the fixed beam 302 can extend forward and upward from the rear beam end 306 to the front beam end 304.

The angle 506 of the beam can influence how loading is transmitted to the ends of the resilient hinge 202 and, thus, how the resilient hinge 202 flexes and permits relative motion between the subframes. In an embodiment, the fixed beam 302 is positioned at the angle 506 such that, when the rear wheels cycle (e.g., when riding over a bump), the chainstay pivots outward and upward relative to the seat tube 126. More particularly, as the fixed beam 302 bends, the chainstays pivot away from the front subframe 118 rather than toward the front subframe 118. Such motion can reduce a risk that the rear subframe 120 will pivot into the front subframe 118. The angled beam and the concomitant kinematics of the subframes provides an advantage in terms of available suspension travel. More particularly, whereas a beam directed parallel to the ground may provide only a few inches of travel, it has been shown that the angled fixed beam 302 can generate suspension travel in a range of 6 to 20 inches. The wide range of travel allows the rear suspension 122 to smooth out and flatten the bumpiest of trails.

From another perspective, the loading of the angled fixed beam 302 relates to the columnar strength of the beam. A beam directed parallel to the ground may be under essentially pure bending, however, the angled beam can have a vertical component (a vertical component of a vector directed along the neutral axis 502) that allows the beam to support the chainstays 114 lower than the attachment to the seat tube 126 and to absorb some impact in column loading. Such columnar loading may contribute to the supportive yet supple suspension that the resilient hinge 202 provides.

It has been shown that the resilient hinge 202, which provides a resilient (spring) joint between the front subframe 118 and the rear subframe 120 inherently reduces wheel bucking. Existing rear suspensions incorporate shocks that, when cycled vigorously such as when jumping the single-track vehicle 100, the shock can rebound. Such rebound, termed wheel bucking, can result from stiction in the shock absorber. Wheel bucking can create an unpleasant riding experience and potentially lead to loss of control of the vehicle. The resilient hinge 202, on the other hand, can be tuned to dampen rebound and eliminate wheel bucking. For example, bending of the fixed beam 302 can relate to beam cross-sectional area, length, and spring material, and those characteristics can be selected to achieve a shock absorbing spring that optimally absorbs impact. Furthermore, the fixed beam 302 requires minimal displacement to absorb impacts effectively, and has no moving parts (and thus, no stiction). It is believed that these characteristics, which differ from existing solutions that require shocks, allow impact energy to be absorbed and dissipated through material deformation and recovery in a manner that does not generate abrupt unloading of the resilient hinge 202 and, thus, eliminates wheel bucking.

Another characteristic of the rear suspension 122, which contributes to favorable performance, is a high motion ratio. Motion ratio may be defined as the distance of travel of the rear wheel 116 in comparison to how much the suspension moves during shock absorption. In the case of the resilient hinge 202, wheel travel is large and displacement of the beam is small (less than an inch), resulting in a high motion ratio. By contrast, shocks on existing rear suspensions move comparatively more. For example, to achieve a similar wheel movement, shocks may have a range of motion of several inches. The high motion ratio is beneficial, and importantly, it is achieved using a lightweight, mechanically simple suspension having no moving parts. As a result, the rear suspension 122 can be less expensive, more compact, more reliable, and can perform better than existing single-track vehicle suspensions.

At this point, the rear suspension 122 of the single-track vehicle 100 has been described. Additional details of a particular embodiment of the fixed beam 302 of the resilient hinge 202 are described below.

Figure 7:
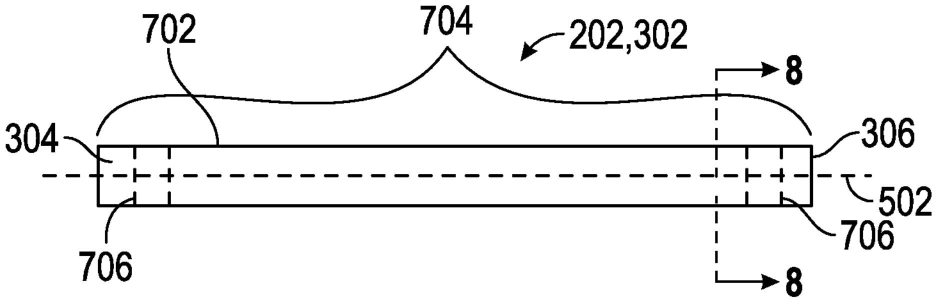
FIG. 7 is a side view of a resilient hinge, in accordance with an embodiment.

Referring to FIG. 7, a side view of a resilient hinge is shown in accordance with an embodiment. The resilient hinge 202, and more particularly the fixed beam 302, can include a plate 702. As described above, the plate 702 can be formed from spring steel or another resilient material. The plate 702 can have a uniform cross-sectional area, and can extend over a length 704. In an embodiment, the plate 702 is flat. For example, the cross-sectional area can be extruded along the neutral axis 502, which may be linear, to form a simple, flat plate. Alternatively, the plate 702 can be a curved plate, similar to a leaf spring. The curved plate can have a neutral axis 502 that, in the unloaded state, is curvilinear. Accordingly, the spring beam can be flat or curved over the length 704.

The length 704 can be tuned to achieve the benefits described above. More particularly, the length 704 can be varied based on a target range of wheel travel, weight of rider, etc. It has been shown that the length 704 of the fixed beam 302 between the front beam end 304 and the rear beam end 306 can be in a range of 3 to 7 inches, e.g., 5 inches, to provide a comfortable trail riding experience.

The plate 702 may be connected to the subframes by welds or fasteners. For example, holes 706 (shown by hidden lines) can be formed through the plate 702 near the beam ends. The holes 706 can receive bolts, such as 5/16 inch diameter bolts, and the bolts can be assembled to the subframes to fix the beam ends.

Figure 8:
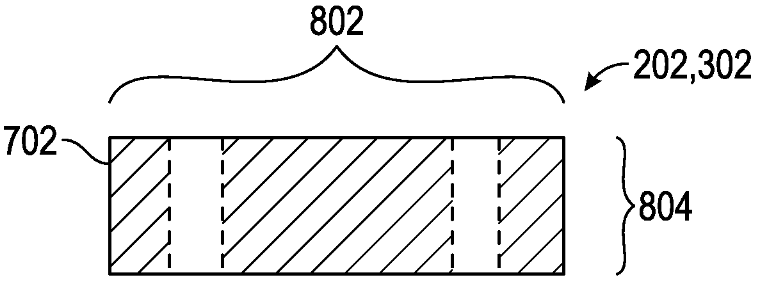
FIG. 8 is a cross-sectional view of a resilient hinge, in accordance with an embodiment.

Referring to FIG. 8, a cross-sectional view of a resilient hinge is shown in accordance with an embodiment. The plate 702 can have a cross-sectional area of various shapes. For example, the cross-sectional area may be elliptical, rectangular, or any other shape. In an embodiment, the plate 702 has a rectangular cross-sectional area. The rectangular cross-sectional area can include a width 802 and a height 804 resulting in a predetermined aspect ratio. More particularly, the rectangular cross-sectional area can have an aspect ratio, defined by the height 804 divided by the width 802, less than 0.5. For example, in an embodiment, the width 802 is in a range of 1 to 3 inches, e.g., 2 inches, and the height 804 is in a range of 0.1 to 1.5 inches, e.g., 0.25 inches, resulting in an aspect ratio of 0.125.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A single-track vehicle frame configured for use with a front wheel and a rear wheel that define a vertical plane, the single-track vehicle frame comprising:

a front subframe including a seat tube extending upward from a bottom bracket shell to support a seat;

a rear subframe having a swingarm including a pair of chainstays defining a horizontal plane transverse to the vertical plane, wherein the bottom bracket shell is vertically above the horizontal plane; and a resilient hinge interconnecting the front subframe and the rear subframe, the resilient hinge including a flat plate having a front beam end fixed to the front subframe at the seat tube above the bottom bracket shell and a rear beam end fixed to the swingarm at a location laterally between the chainstays and vertically below the bottom bracket shell, and wherein the flat plate has a neutral axis extending within the vertical plane.

2. The single-track vehicle frame of claim 1, wherein the flat plate is between the front subframe and the rear subframe.

3. The single-track vehicle frame of claim 1, wherein an angle between the neutral axis and the horizontal plane is oblique.

4. The single-track vehicle frame of claim 3, wherein the angle is in a range of 25 to 65 degrees.

5. The single-track vehicle frame of claim 1, wherein the flat plate has a rectangular cross-sectional area, and wherein the rectangular cross-sectional area has an aspect ratio less than 0.5.

6. The single-track vehicle frame of claim 1, wherein a length of the flat plate between the front beam end and the rear beam end is in a range of 3 to 7 inches.

7. The single-track vehicle frame of claim 1, wherein the flat plate is formed from spring steel.

8. The single-track vehicle frame of claim 1 further comprising a support linkage interconnecting the front subframe and the rear subframe, wherein the support linkage includes a front link coupled to the front subframe, a rear link coupled to the rear subframe, and an intermediate joint interconnecting the front link and the rear link.

9. A bicycle frame configured for use with a front wheel and a rear wheel that define a vertical plane, the bicycle frame comprising:

a front subframe having a seat tube extending upward from a bottom bracket shell;

a rear subframe having a pair of chainstays defining a horizontal plane transverse to the vertical plane, wherein the bottom bracket shell is vertically above the horizontal plane; and a resilient hinge interconnecting the front subframe and the rear subframe, the resilient hinge including a flat plate having a front beam end fixed to the front subframe at the seat tube above the bottom bracket shell and a rear beam end fixed to the rear subframe at a location laterally between the chainstays and vertically below the bottom bracket shell, and wherein the flat plate has a neutral axis extending within the vertical plane.

10. The bicycle frame of claim 9, wherein an angle between the neutral axis and the horizontal plane is oblique.

11. The bicycle frame of claim 9 further comprising a support linkage interconnecting the front subframe and the rear subframe, wherein the support linkage includes a front link coupled to the front subframe, a rear link coupled to the rear subframe, and an intermediate joint interconnecting the front link and the rear link.

12. A bicycle, comprising:

a fork coupled to a front wheel;

a front subframe having a seat tube extending upward from a bottom bracket shell and a head tube, wherein the fork is mounted on the head tube;

a rear subframe having a pair of chainstays coupled to a rear wheel, the front wheel and the rear wheel defining a vertical plane, the pair of chainstays defining a horizontal plane transverse to the vertical plane, wherein the bottom bracket shell is vertically above the horizontal plane; and a resilient hinge interconnecting the front subframe and the rear subframe, the resilient hinge including a flat plate having a front beam end fixed to the front subframe at the seat tube above the bottom bracket shell and a rear beam end fixed to the rear subframe at a location laterally between the chainstays and vertically below the bottom bracket shell, and wherein the flat plate has a neutral axis extending within the vertical plane.

13. The bicycle of claim 12, wherein an angle between the neutral axis and the horizontal plane is oblique.

14. The bicycle of claim 12 further comprising a support linkage interconnecting the front subframe and the rear subframe, wherein the support linkage includes a front link coupled to the front subframe, a rear link coupled to the rear subframe, and an intermediate joint interconnecting the front link and the rear link.

* * * * *